United States Patent [19]

Adams, IV

[11] Patent Number: 4,524,476
[45] Date of Patent: Jun. 25, 1985

[54] BEE SHIPPING BOX AND HIVE

[76] Inventor: John Q. Adams, IV, 1206 Foxcroft Rd., Richmond, Va. 23229

[21] Appl. No.: 580,124

[22] Filed: Feb. 14, 1984

[51] Int. Cl.³ ............................................. A01K 47/00
[52] U.S. Cl. ................................................... 6/1; 6/5; 6/2 R
[58] Field of Search ...................... 6/1, 2 R, 2 A, 5, 7, 6/9

[56] References Cited

U.S. PATENT DOCUMENTS

| 122,598 | 1/1872 | Gladding | 6/2 R |
| 486,277 | 11/1892 | Chrisinger | 6/1 |
| 697,741 | 4/1902 | Neiszer | 6/2 R |
| 1,242,628 | 10/1917 | Woodman | 6/2 R |
| 1,270,507 | 6/1918 | Fleming | 6/1 |

FOREIGN PATENT DOCUMENTS 126127  9/1949  Sweden ........................ 6/1

Primary Examiner—Robert P. Swiatek
Assistant Examiner—Cary E. Stone
Attorney, Agent, or Firm—B. P. Fishburne, Jr.

[57] ABSTRACT

A combination bee shipping box and beehive utilizes a commercial cardboard box having closure flaps as a body portion. A cardboard insert removably held in the box strengthens the box and provides a support for a plurality of standard frames or top bar frames. A flexible handle connected with the insert enables lifting the insert and supported frames from the box as a unit. When the box closure flaps are elevated and taped together, an additional tier of frames can be supported above the frames resting on the basic insert. Two boxes can be telescoped in assembled relationship to receive and support additional tiers of frames therein. A stable removable feeder assembly is provided in the space above the frames and below the box closure flaps to nourish bees during shipment. A ventilating screen closure panel for the box while being used as a hive is provided.

7 Claims, 8 Drawing Figures

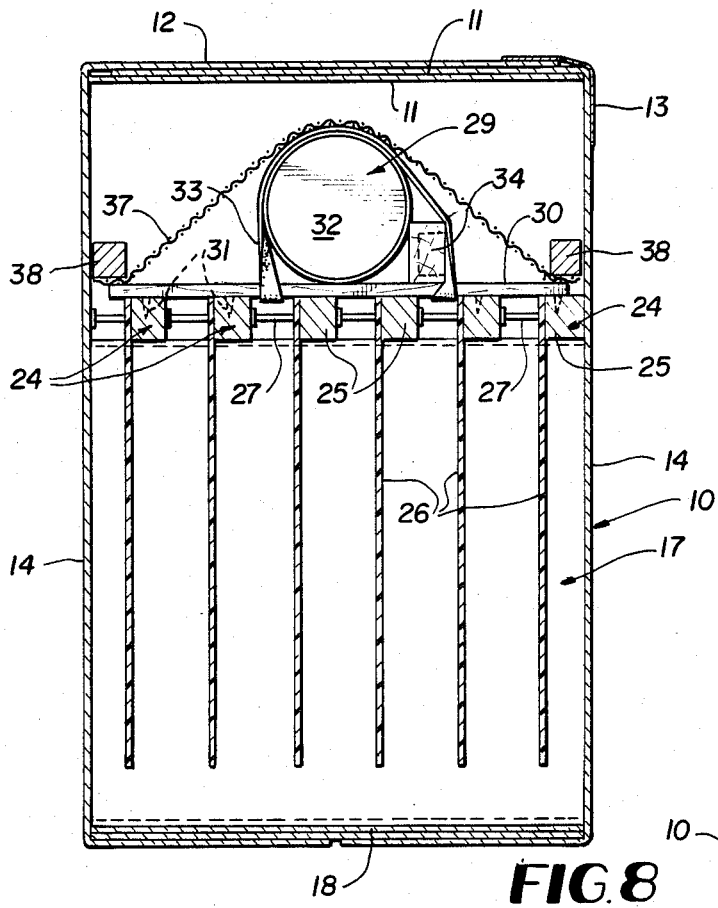
FIG.3
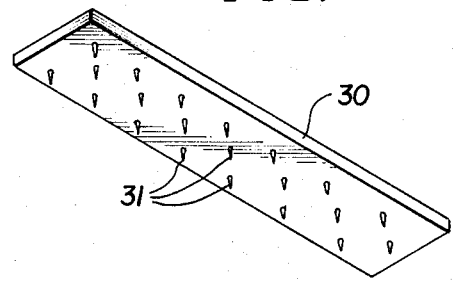
FIG.4
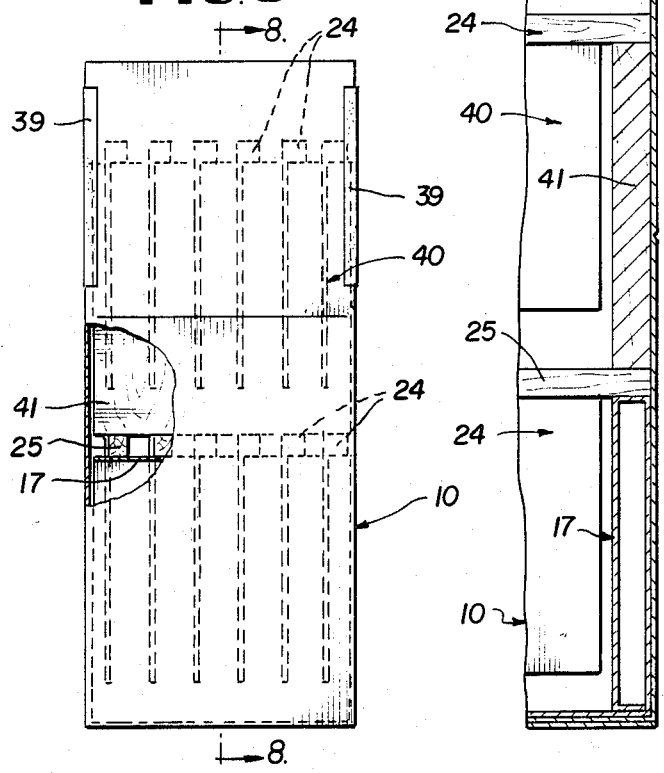
FIG.6
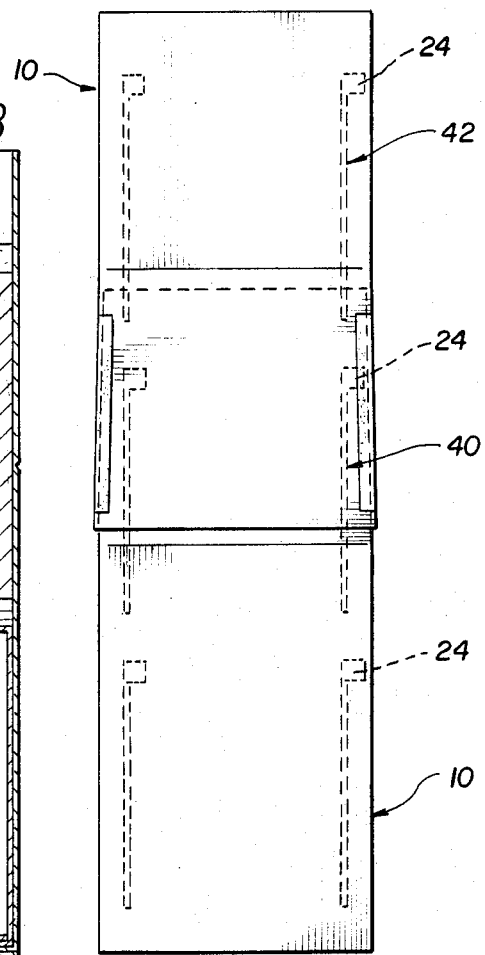
FIG.7
FIG.8

BEE SHIPPING BOX AND HIVE

BACKGROUND OF THE INVENTION

The objective of the present invention is to satisfy a need in the art for an economical and practical combination shipping box and hive for bees. In realizing the invention, a commercial cardboard rectangular box is utilized as the body for the shipping box and hive. The cardboard is sufficiently durable to last several seasons when used as a hive, particularly where minimum precautions are taken to shield the hive from the elements.

A further object of the invention is to provide a device of the above-mentioned character which utilizes a bodily liftable cardboard insert within the box body to support a plurality of frames which may be lifted from the box body with the insert as a unit, flexible lifting handles being provided on the insert to facilitate the lifting operation.

A further object and feature of the invention resides in the provision of economical and efficient feeding and ventilating means on a combined bee shipping box and beehive.

Still another object of the invention is to provide a multiple level beehive containing multiple tiers of supported frames therein and having a vertically elongated body portion formed by telescoping two cardboard box bodies together in assembled relationship.

Other features and advantages of the invention will become apparent to those skilled in the art during the course of the following detailed description.

BRIEF DESCRIPTION OF THE DRAWINGS

FIG. 3 is a vertical section at right angles to FIG. 2, taken on line 3—3 of FIG. 1.

FIG. 4 is a perspective view of a feeder unit base plate.

FIG. 6 is an end elevation of the device in use as a dual level beehive.

FIG. 7 is a similar view of a multi-level beehive according to the invention.

FIG. 8 is an enlarged fragmentary vertical section taken on line 8—8 of FIG. 6.

DETAILED DESCRIPTION

Figure 1:
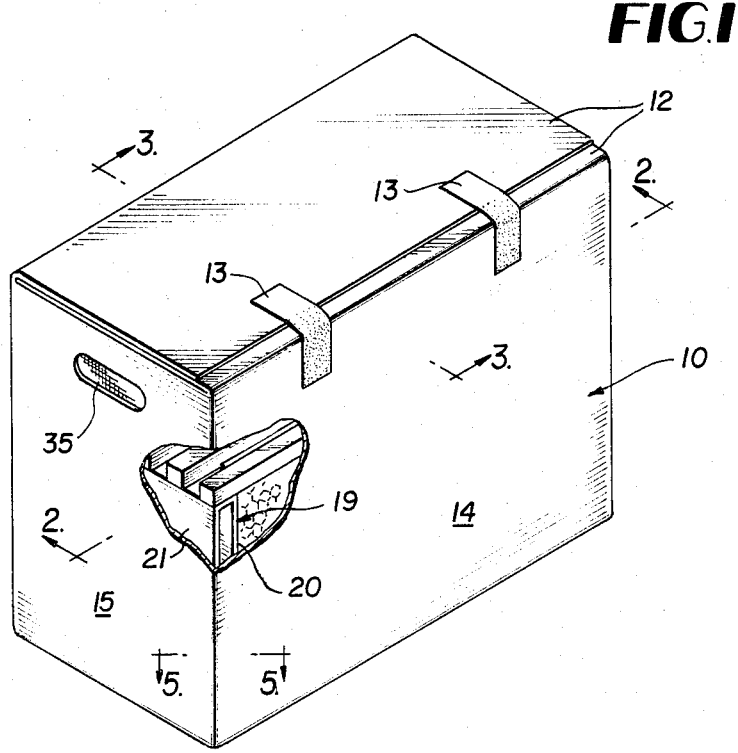
FIG. 1 is a perspective view of a bee shipping box readily convertible to a beehive in accordance with the present invention.

Referring to the drawings in detail wherein like numerals designate like parts, the numeral 10 designates a shipping box for bees, also adapted to form a beehive at a destination point. The shipping box 10 is rectangular and somewhat elongated. It is formed of heavy cardboard and can be embodied in a commercial cardboard box blank, without the necessity for any customized die cutting. The cardboard box 10 has conventional end and side top closure flaps 11 and 12 hinged thereto. When used for shipping bees, the flaps 11 and 12 are folded into overlapping relationship and are secured by adhesive tapes 13 which are subsequently removed when the device is to be used as a beehive in accordance with the invention. The box 10 includes conventional side, end and bottom walls 14, 15 and 16.

Removably placed in the box 10 is a cardboard insert 17 having a single thickness bottom wall 18 resting on the box bottom wall, and a pair of opposite end vertical reinforcing and spacing members 19 which lie immediately inwardly of the box end walls 15. The members 19 are hollow and constitute integral extensions of the insert bottom wall 18 formed by folding. Each member 19 thus formed consists of spaced parallel inner and outer walls 20 and 21 and narrow right angular top and bottom walls 22 and 23. The folded members 19 are quite rigid and serve to materially strengthen the box 10 when the insert is in place therein. The insert 17 extends for the full interior width of the box between its side walls 14, and preferably fits snugly inside of the box. The two top walls 22 of the insert are at the same elevation and are horizontal. They are disposed approximately two-thirds of the vertical height of the box 10 above its bottom wall 16.

In addition to reinforcing the cardboard box 10, the insert 19 serves to stably support a plurality, such as six, of honeycomb frames 24 such as the illustrated top bar frames. In some cases, standard rectangular frames may be used in lieu of the top bar frames. The end faces of the top bars 25 of frames 24 substantially engage the box end walls 15 to eliminate end play, FIG. 2.

The frames 24 include any conventional type of depending foundation sheet 26 attached thereto. Lateral spacer elements 27, FIG. 3, projecting from each top bar 25 at one side thereof engage the next adjacent bar and maintain a desired parallel spaced relationship of the frames 24 in the box 10 without appreciable lateral play. The spacer elements 27 preferably comprise nails which serve to attach the foundation sheets 26 to corresponding side faces of the top bars 25. These nails are placed in the top bars near their opposite ends.

Figure 2:
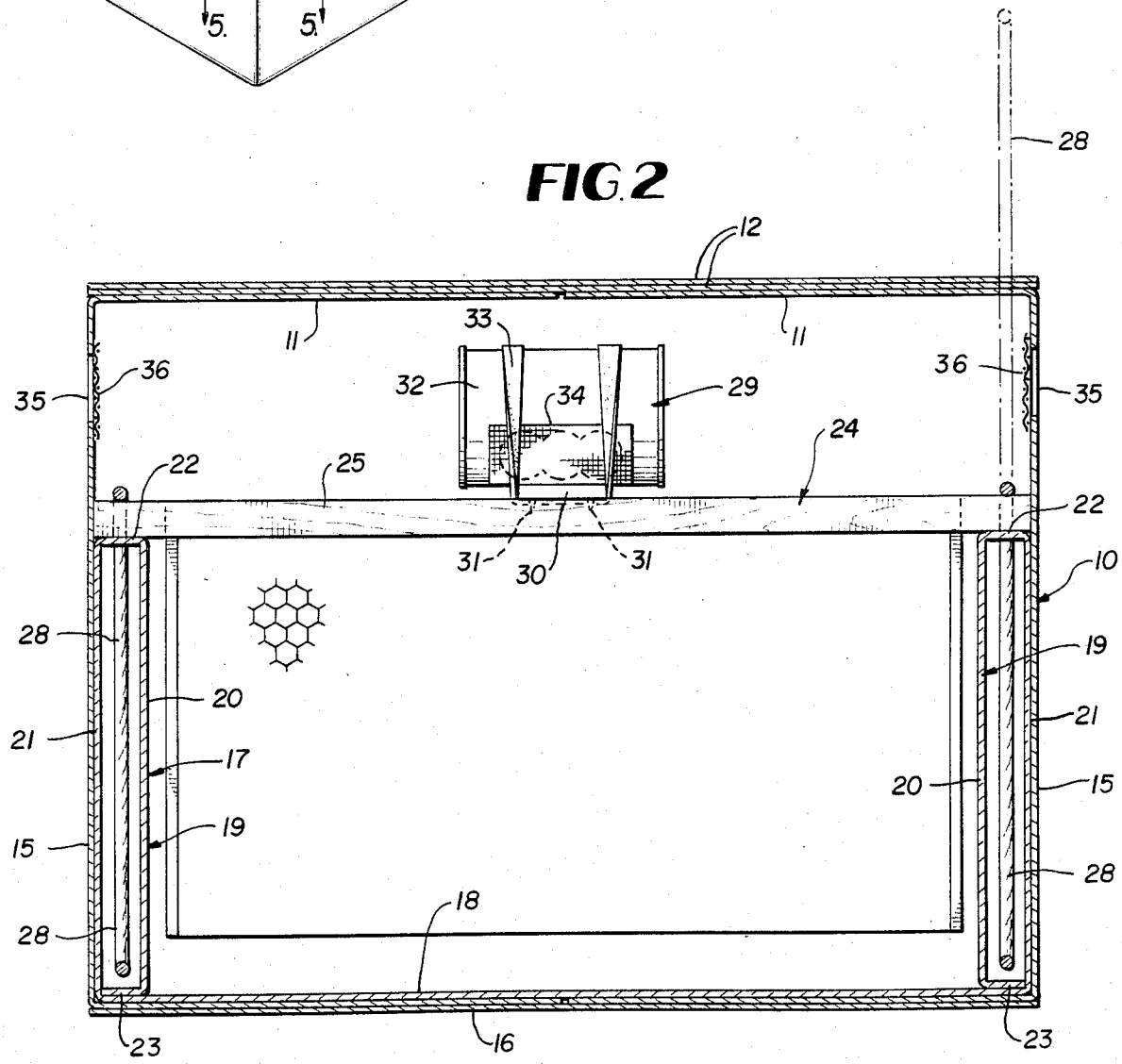
FIG. 2 is a vertical section taken on line 2—2 of FIG. 1.

Flexible rope loops 28 serving as lifting handles for the entire insert 17 are placed within the hollow folded members 19 and can be drawn upwardly to lifting positions as shown in phantom lines in FIG. 2. When the insert 17 is lifted from the box 10 by the attached extensible rope loop handles 28, the supported frames 24 are also lifted from the box as one unit with the insert. This is a substantial convenience over the task of prying loose and then lifting each frame 24 separately from the box, as when the frame is laden with honey and beeswax.

In accordance with an important feature of the invention, a feeding assembly 29 for the bees during shipment is provided. This assembly includes a spiked base plate 30 formed of wood which may be pressed firmly into releasable impaled engagement across the tops of the wooden frame bars 25, with the spikes 31 of the base plate 30 biting into these frame bars. As shown in FIG. 3, the base plate 30 spans the frame top bars 25 transversely.

A suitable cylindrical container 32 of liquid nourishment for the bees during transit is secured to the base plate 30 by a single elastic band 33. An isolated screen covered enclosure 34 for a queen bee is also held on the base plate 30 against the container 32 by the elastic band 33. The bottom of the container 32 can be punctured with small apertures so that the bees during shipment can draw out the liquid nourishment. At the destination point, the entire feeder assembly 29 can be easily removed from the box as a unit, and set aside.

During shipment with bees, while the top box flaps 11 and 12 are taped closed, hand holds 35 in the end walls of the box end are covered with screening 36 to provide ventilation. Additional screen-covered openings can be provided for this purpose.

In hot weather conditions, the box flaps 11 and 12 can be raised vertically and taped together in upstanding relationship to leave the box open at its top. When this is done during shipment, the top of the box is covered by a screen section 37 provided with the equipment having a pair of wooden bars 38 attached to opposite ends thereof which can be tacked or stapled to the upstanding side walls 14, as shown in FIG. 3. The screen section 37 is sufficiently long between the two bars 38 to bridge over the top of container 32. When the flaps 11 and 12 are up, the screen section 37 prevents bees from leaving the shipping box in transit.

After being received by a customer, the box 10 is easily converted to a beehive, sufficiently durable to last for several seasons. To make this conversion, the taping 13 is removed and the flaps 11 and 12 are raised vertically and taped in standing positions at their vertical corners, as shown at 39 in FIG. 6. The feeder unit 29 is removed and set aside and the queen is released from the enclosure 34. The screen section 37 can be removed or partly removed as by folding it back upon itself to provide an adequate entranceway for bees into and out of the hive.

If it is desired to utilize the hive with a second tier 40 of frames 24 above the frames supported on the insert 17, it is merely necessary to place two end vertical spacer plates 41 on the top bars 25 of the lower tier of frames 24, and then place the end portions of the top bars of the frames in the upper tier 40 on these spacer plates. The two tiers of frames, FIG. 6, can thus be properly supported in the one cardboard box 10 having its closure flaps taped in upstanding relationship.

As shown in FIG. 7, a third tier 42 of frames 24 can be supported above the second tier 40 in a three tier hive. To accomplish this, the taped closure flaps of two cardboard boxes 10 are telescoped together vertically, and two additional end spacer plates 41 are placed upon the top bars 25 of the frames 24 in the second tier 40 to support the top bars of the third tier 42 of frames.

Figure 5:
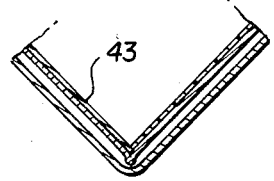
FIG. 5 is an enlarged corner horizontal section taken on line 5—5 of FIG. 1.

To protect the cardboard hives from the elements, they may be placed beneath a sheltering roof or simply covered with building paper or the like. Greater durability can be imparted to the cardboard hives by coating their interior surfaces with a tough plastic coating 43, FIG. 5, which prevents the bees from chewing through the walls of the hive or shipping box. As shown in FIG. 5, the walls of the box are corrugated in the customary manner.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A bee shipping box and beehive unit comprising a rectangular open top box body having hinged top closure flaps, a reinforcing insert removably mounted in the box body and resting on the bottom wall thereof and including end hollow spacing members adjacent to the end walls of the box body and having top support surfaces, plural frames having top bars resting on said support surfaces, flexible handles connected with the spacing members by means of which the insert and frames are liftable bodily from the box body, a feeder assembly mounted removably on the frame top bars within the top portion of the box body, and a screen closure section within the box body above the frames and having end bars adapted to be releasably secured to the side walls of the box body.

2. A bee shipping box and beehive unit as defined in claim 1, and said insert comprising a unitary folded section of stiff sheet material including a single thickness bottom wall, and said spacing members having spaced inner and outer vertical side walls joined at their tops by narrow horizontal walls disposed at the same elevation in the box body well below the top thereof.

3. A bee shipping box and beehive unit as defined in claim 2, and said insert and box body being formed of corrugated cardboard.

4. A bee shipping box and beehive unit as defined in claim 1, and said feeder assembly including a spiked base plate adapted to be pressed into releasable impaled engagement with the top surfaces of said frame top bars transversely of the latter.

5. A bee shipping box and beehive unit as defined in claim 4, and said feeder assembly comprising a feeding container resting on said spiked base plate, and an elastic band encircling the base plate and container and uniting the same.

6. A bee shipping box and beehive unit as defined in claim 1, and lateral spacing elements projecting horizontally from corresponding sides of said frame top bars and engaging the opposing side faces of adjacent top bars to prevent lateral displacement of said frames in said box body.

7. A bee shipping box and beehive unit comprising a rectangular cardboard box body having top closure flaps, a folded unitary cardboard insert disposed removably in the box body and resting on the bottom wall thereof, said insert including end folded vertical hollow spacing members adjacent to opposing end walls of the box body and having top surfaces disposed at the same elevation in the box body, a plurality of frames including top bars resting on the top surfaces of said spacing members, lifting handle means on said insert by means of which said insert and all of said frames can be lifted bodily as a unit from the box body, and additional vertical spacing members resting on said frame top bars adjacent to the end walls of the box body, a second tier of frames including top bars resting on the tops of said additional spacing members to form a two-level beehive in the box body, and the top closure flaps of the box body being secured in upstanding relationship to form an extension on the box body receiving the second tier of frames.

* * * * *